US006280820B1

(12) United States Patent
Martino

(10) Patent No.: US 6,280,820 B1
(45) Date of Patent: Aug. 28, 2001

(54) SEMI-FINISHED WOOD SIMULATING PRODUCT AND METHOD

(75) Inventor: Ralph A. Martino, Tampa, FL (US)

(73) Assignee: Premdor, Inc. (CA)

( * ) Notice: Subject to any disclaimer, the term of this patent is extended or adjusted under 35 U.S.C. 154(b) by 0 days.

(21) Appl. No.: 09/397,877

(22) Filed: Sep. 17, 1999

Related U.S. Application Data

(62) Division of application No. 08/800,798, filed on Feb. 18, 1997, now Pat. No. 5,989,681, which is a division of application No. 08/448,880, filed on May 24, 1995, now Pat. No. 5,597,620, which is a division of application No. 08/163,798, filed on Dec. 9, 1993, now abandoned.

(51) Int. Cl.[7] .............................. B32B 23/08; B32B 27/30

(52) U.S. Cl. ........................ 428/151; 428/514; 428/537.1; 428/542.2

(58) Field of Search .............................. 428/15, 151, 514, 428/537.1, 542.2; 52/783.12, 784.16

(56) References Cited

U.S. PATENT DOCUMENTS 3,738,854 * 6/1973 Oishi ........................................ 117/8
3,983,307 * 9/1976 Power et al. ........................... 428/503
5,059,264 * 10/1991 Sheets ................................. 156/62.2

FOREIGN PATENT DOCUMENTS 52-82705 * 7/1977 (JP) .
54-079705 * 6/1979 (JP) .

* cited by examiner

*Primary Examiner*—D. S. Nakarani
(74) *Attorney, Agent, or Firm*—Liniak, Berenato, Longacre & White, LLC

(57) ABSTRACT

A semi-finished wood simulating product and method is disclosed. The product is manufactured by providing a substrate having at least one surface to be finished. A liquid basecoat is applied on the substrate and dried. A wood grain pattern is deposited, in liquid form, on the basecoat. Some of the pattern is transferred from the originally deposited position on the basecoat to a subsequent position. The pattern is then cured. A polymerizable protective coating is applied onto the substrate overlying the basecoat and the pattern. The protective coating seals the substrate and is adapted for accepting a colorant to be applied by an end user. The protective coating is then polymerized. Additionally, if a porous substrate is provided, a sealer is applied prior to the liquid basecoat and is then cured.

23 Claims, 1 Drawing Sheet

SEMI-FINISHED WOOD SIMULATING PRODUCT AND METHOD

This application is a divisional of U.S. application Ser. No. 08/800,798 filed Feb. 18, 1997, now U.S. Pat. No. 5,989,681, which is a divisional of U.S. application Ser. No. 08/448,880 filed May 24, 1995, now U.S. Pat. No. 5,597, 620, which is a divisional of U.S. application Ser. No. 08/163,798 filed Dec. 9, 1993, now abandoned.

FIELD OF THE INVENTION

The present invention relates generally to semi-finished wood simulating products and methods, and more particularly to semi-finished products capable of accepting wood stain, paint or varnish as applied by an end user at an installation site and methods of manufacturing semi-finished wood simulating products.

BACKGROUND OF THE INVENTION

There is a need to substitute wood simulating products for solid or real wood products to reduce material costs. This need to substitute simulated wood products for real wood is particularly acute for hardwood products. These hardwoods include woods such as lauan mahogany, and other woods of that same family, the bulk of which come from the Philippines and other pacific and forest locations. Over the last ten years, the availability of such woods has greatly diminished, and the remaining supply has diminished markedly in quality. There are also substantial environmental issues and concerns affecting both the quality and quantity of the real wood supply, in part, because these woods come from "rain forest" areas which have been "harvested" over the years as part of a general land clearing program which did not include replanting, etc.

A traditional method of manufacturing simulated wood products such as paneling, or door-skins for hollow core doors, involves utilizing a non-solid wood substrate such as a wood composite or fiberboard substrate and overlaying this substrate with a paper overlay and then applying a protective coating to the paper overlay. Vinyl overlays may also be used. There are numerous problems inherent in the traditional methods. These problems include the risk of the paper or vinyl overlay product peeling from the substrate. Another problem is that bubbles and blisters sometimes occur in the overlay process. Other problems are that the protective coating is not cleanable with a solvent or capable of being sanded to eliminate surface imperfections and scratches which occur during shipping and handling. Most importantly, the type of wood being simulated and the color of its stain must be determined at the manufacturing facility and is not changeable by the user at the installation site.

OBJECTS AND SUMMARY OF THE INVENTION

It is, therefore, an object of the present invention to provide a product and method for manufacturing semi-finished wood simulating products which eliminate or obviate the above mentioned problems.

It is another object of the present invention to provide a product capable of accepting stain, paint, or varnish as applied by an end user at the installation site.

It is another object of the present invention to provide a product that simulates the visual appearance and tactile qualities of real wood.

It is another object of the present invention to provide a product that is more durable than existing products and can be lightly sanded to eliminate scratches and surface imperfections.

It is another object of the invention to provide a product that can be cleaned with a solvent.

It is yet another object of the present invention to provide a semi-finished wood simulating product which is simple in construction, effective in use and economical to manufacture.

These objects are achieved by providing a substrate having at least one surface to be finished. A liquid basecoat is applied on the substrate and dried. A wood grain pattern is deposited, in liquid form, on the basecoat. Some of the pattern is transferred from the originally deposited position on the basecoat to a subsequent position. The pattern is then cured. A polymerizable protective coating is applied onto the substrate overlying the basecoat and the pattern. The protective coating seals the substrate and is adapted for accepting a colorant to be applied by an end user. The protective coating is then polymerized. Additionally, if a porous substrate is provided, a sealer is applied prior to the liquid basecoat and is then cured.

These and other objects of the present invention will become apparent from the following detailed description and appended claims.

The invention may best be understood with reference to the accompanying drawings wherein illustrative embodiments are shown.

DETAILED DESCRIPTION OF THE INVENTION

Figure 2:
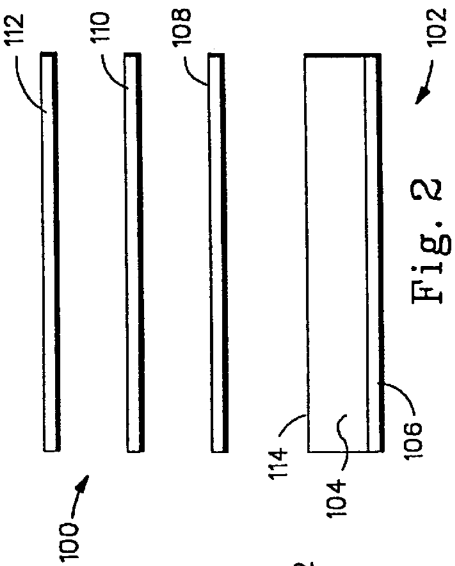
FIG. 2 is an exploded cross-sectional view showing a porous substrate and various layers of coatings applied to the porous substrate.

Referring first to FIG. 2, semi-finished wood simulating product 100 includes a substrate 102, a sealer 108, a top or base coat 110, a printed wood grain pattern (not shown), and a protective coating 112. Substrate 102 may be a composite wood material, such as pressboard or medium density fiberboard, having a porous composite layer 104 and a backing layer 106. Sealer 108 is applied to a porous surface 114 of substrate 102 to create a uniformly impermeable surface on which to apply subsequent materials. A thick, colored, viscous basecoat 110 is roller applied to sealed surface 114, with the color selected to reflect the general "background ambient color" of the wood being simulated. A wood grain pattern (not shown) chosen to simulate a particular wood, is then printed on basecoat 110. A protective coating 112 is applied to protect the wood grain pattern. The protective coating 112 is transparent/translucent so that the printed wood grain pattern is visible through protective coating 112. Protective coating 112 is sufficiently porous so as to be stainable by the end user at the installation site. Protective coating 112 is also hard enough to allow the product to be stacked and shipped horizontally, without substantial degradation occurring to the outer surface of protective coating 112.

Figure 3:
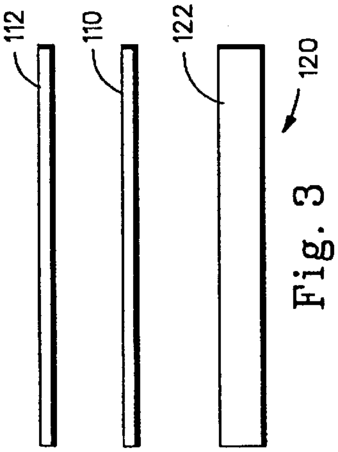
FIG. 3 is an exploded cross-sectional view showing a non-porous substrate and various layers of coatings applied to the non-porous substrate.

A second embodiment of the present invention is shown in FIG. 3. A semi-finished wood simulating product 120 includes a non-porous substrate 122, such as sheet metal, a thick, colored, viscous basecoat 110 applied thereon, a wood grain pattern printed (not shown) on basecoat 110, and a protective coating 112 applied to protect the wood grain pattern.

Sealer 108 is used to avoid blotching when a substrate having a porous surface to be finished is going to be stained by the end user at the installation site, and is therefore not necessary with the product 120 and its non-porous substrate 122. Stain or colorant applied by the end user may penetrate the entire protective layer 112 and even the basecoat 110 and, but for sealer 108, into the porous surface 114. Because t he hardness/absorbability of the underlying composite wood materials is non-uniform (i.e., varies throughout a given sheet), the stain would be able to penetrate the underlying porous surface in some places and not in others, and thus create a blotchy look. Basecoat sealer 108 is not necessary when using a non-porous substrate, or if only varnish or paint is to be applied by the end user.

Figure 1:
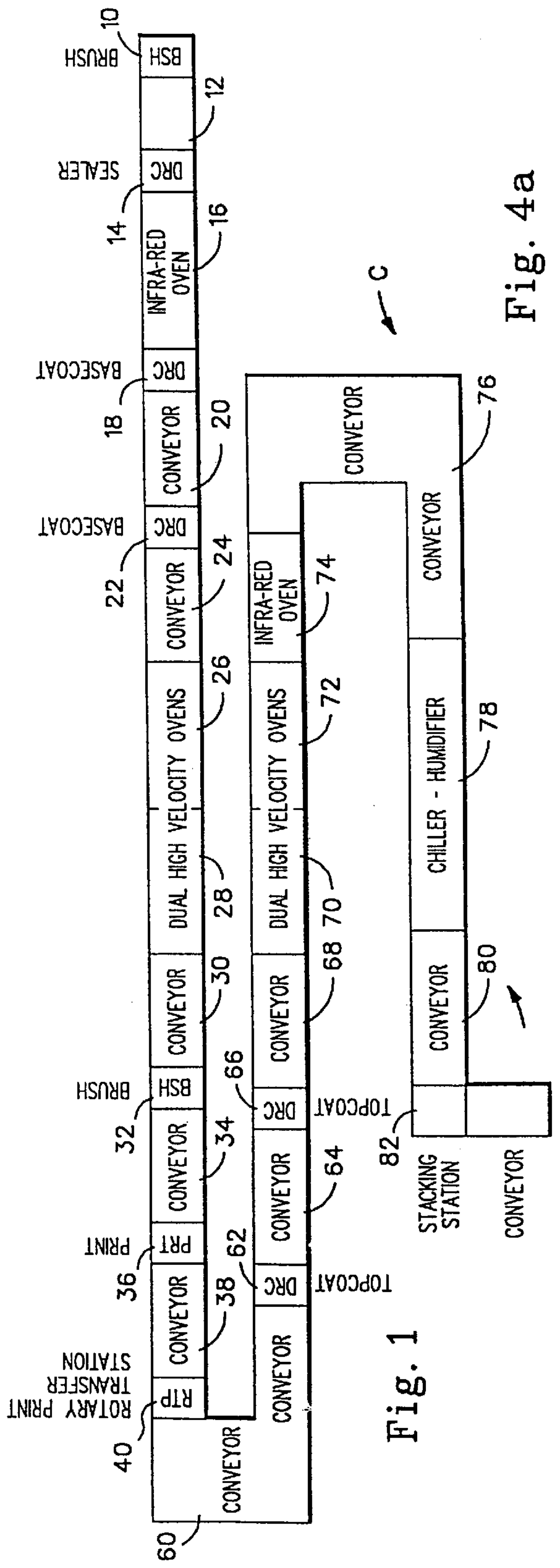
FIG. 1 is a schematic illustration according to the present invention depicting a conveyor line for manufacturing a semi-finished wood simulating product.

The method of manufacturing a semi-finished wood simulating product can best be understood with reference to FIG. 1. It should be understood that the layout shown is for illustrative purposes only and the layout and size of each of the elements is not meant to be limited. For purposes of completeness, the method of manufacturing will be described with reference to a product utilizing a composite wood substrate 102. It will be understood that the product could also be manufactured using a non-porous substrate 122 by eliminating some of the process steps required to process a product using a composite wood substrate.

Substrate 102 enters a horizontal conveyor system C at multi-brush cleaning station 10 with surface 114 facing upwardly. Surface 114 of substrate 102 is cleaned using multi-rotary brushes, which clean the surface; adhesion of the subsequent layers may be adversely affected if surface 114 is not clean.

Conveyor portion 12 transports clean substrate 102 to direct roll coating station 14 where liquid sealer 108 is applied to surface 114. Sealer 108 is an acrylic sealer, preferably from AKZO Coatings, Inc. under their product number 641-Y029-42. Conveyor system C then transports substrate 102 having sealer 108 to an infrared oven 16, which cures and sets sealer 108.

Substrate 102 having a dry sealer 108 then enters a first direct roll coating station 22 where liquid basecoat 110 is applied. Basecoat 110 is a low volatile organic content ("VOC") water based vinyl acrylic copolymer having a viscosity of 38 seconds on a #2 Zahn cup, and is available from AKZO Coatings, Inc. under their product number 651-W029-12.

A conveyor portion 20 then transports substrate 102 having wet basecoat 110 to a second direct roll coating station 22. Due to the length of conveyor portion 20, the first layer of basecoat begins to level on account of the dwell time. A second layer of the basecoat is then applied on the first layer of basecoat, each layer having a thickness of approximately 0.003 inches. The second layer of basecoat is then allowed to level while being transported on conveyor portion 24.

The controlled viscosity of basecoat 110 causes the basecoat 110 to have the tactile qualities, when dry, of raw wood. Because the basecoat is applied in two coats, then the resulting thickness must be controlled. If the basecoat is too thick, it may crack and thus be unusable for the resulting product. Because the basecoat 110 is applied in two coats, then if sealer 108 is not covered by the first layer of basecoat 110 it will be covered by the second layer of basecoat 110.

The conveyor portion 24 then transports substrate 102 having two coats of wet basecoat 110 to two sequential dual high velocity ovens 26 and 28. Oven 26 is set to approximately 250° F., in order to prevent the basecoat 110 from forming a skin, and oven 28 is set to approximately 375° F. The dwell time of substrate 102 in dual ovens 26 and 28 is approximately 15 seconds, with the surface temperature when exiting the oven 28 being at about 131° F. The ovens 26 and 28 are each convection ovens, which cause the solvent to be moved relatively rapidly away from the substrate. The ovens 26 and 28 dry and set the two layers of the basecoat.

A conveyor portion 30 then transports substrate 102 from oven 28 to a brush station 32. The basecoat 110 layers are allowed to cool in ambient air during the transport because of the dwell time achieved. Basecoat 110 should be dry and hard so that basecoat 110 is not malleable. At brush station 32, the outer surface of the second layer of basecoat 310 is burnished with high speed rotary brushes which remove grooves in the basecoat 110 and any fibers and the like lying upon the surface.

A conveyor portion 34 then transports substrate 102 to a rotogravure print station 36. While on conveyor portion 34, the burnished surface of basecoat 110 cools to remove the heat from the burnishing operation. Substrate 102 is sequenced prior to entering print station 36 in preparation for wood grain printing. A wood grain pattern, such as of mahogany, teak, or oak, is applied using conventional rotogravure technique at print station 36. The wood grain pattern is printed with an acrylic print ink available from AKZO Coatings, Inc. under their product number 699-C029-370A.

Print station 36 includes a 48 inch print cylinder (not shown) underneath which rolls substrate 102. Substrate 102 has a length of about 80.5 inches, and each substrate 102 is sequenced for entry into print station 32 so that no two print patterns are exactly the same. The pattern is randomly printed on basecoat 110 by timing entry of the input edge of each substrate 102 relative to the print drum. Thus, each substrate 102 has certain unique properties and characteristics, which, although subtle, enhance the real wood look and feel.

Figure 4A:
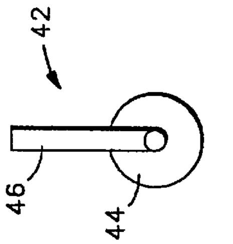
FIG. 4*a* is a side elevational view of a high pressure roller.
Figure 4B:
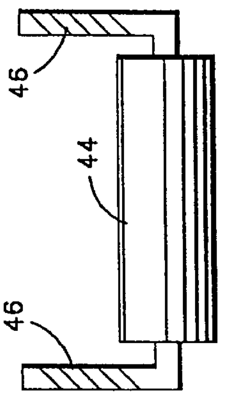
FIG. 4*b* is a front elevational view of the high pressure roller of FIG. 4*a*.

A conveyor portion 38 then transports the substrate having a wood grain pattern printed thereon to a rotary print transfer station 40. During this approximately 9 second transport, the print ink begins to dry and portions become tacky. As best shown in FIGS. 4*a* and 4*b*, rotary print transfer station 40 includes a high pressure roller assembly 42 including a roller 44 and a screw jack pressing mechanism 46. Roller 44 is approximately six inches in diameter, and is made of a modified polyvinyl-type rubber having a 45–50 durometer. Roller 44 rolls relative to lead or input edge of substrate 102 to the opposite or exit edge. Screw jacks 46 press roller 44 against the drying wood grain pattern so that the wet or tacky ink on the surface of basecoat 110 is picked up by roller 44 and then transferred to a circumferentially spaced location where the wet and tacky portions are then reapplied to basecoat 110. Thus the print pattern has voids and skips which enhance the uniqueness of the product because no two appear exactly alike. The finish achieved resembles distressed wood.

A conveyor portion 60 then transports substrate 102 to a direct roll coater 62. While on conveyor portion 60, the print ink of the grain pattern dries. Direct roll coater 62 applies a first layer of a protective coating 112. Protective coating 112 is an acrylic/amino low volatile organic content, high solids, pigmented temperature converted or polymerizable coating available from AKZO Coatings, Inc., under their product number G81-C029-123. The viscosity of protective coating 112 is 22 seconds on a #2 Zahn cup. Protective coating 112 includes a methane sulfonic acid catalyst available from AKZO Coatings, Inc., under their product number G49-PJ029-23. The catalyst is 9% by volume of protective coating 112. The first layer of protective coating has a thickness of approximately 0.003 inches.

A conveyor portion 64 then transports the substrate 102 to a second direct roll coater 66 where a second layer of the protective coating 112 is applied. Because protective coating 112 is applied in two coats, it is ensured that, if the wood grain pattern is not covered by the first layer of protective coating 112, then it will be covered by the second layer of protective coating 112.

A conveyor portion 68 transports substrate 102 having two uniform layers of protective coating 112 applied thereon to two dual high velocity ovens 70 and 72. Substrate 102 remains on conveyor portion 68 for approximately 3 seconds to allow protective coating 112 to level.

Dual high velocity ovens 70 and 72 set the coating 112 and remove the low volatile organic content cosolvents therefrom. Oven 70 is set to approximately 275° F., and oven 72 is set to approximately 300° F. The entering temperature of substrate 102 to oven 70 is about 92° F., and the surface temperature when exiting oven 72 is about 185° F.

Conveyor C then transports substrate 102 having two layers of protective coating 112 thereon to an infrared oven 74. Oven 74 is set at approximately 1,700° F., so that full polymerization of coating 112 is achieved. Full polymerization occurs at a temperature of about 300° F., and occurs at the surface of protective coat 112 at a transport speed of 200 feet per minute. Satisfactory polymerization is achieved at a surface temperature of 220° F. Polymerization of protective/stainable coating 112 occurs while substrate 102 is in oven 74.

A conveyor portion 76 then transports substrate 102 having a polymerized protective coating 112 thereon to a combination chiller-humidifier 78. During this time, product 100 is allowed to cool in ambient air. Chiller-humidifier 78 rapidly reduces the temperature of product 100 to about 124° F., and rehumidifies the product prior to stacking.

A conveyor portion 80 then transports product 100 from chiller-humidifier 78 to a stacking station 82 where product 100 is stacked. The stacks may be lifted by a fork lift for transfer to a flat bed or the like so that the resulting semi-finished products 100 may be transported to the end user.

It should be understood that two layers of stainable/protective coating 112 produce a coating which is both durable and thick enough to permit the surface to be lightly sanded so that imperfections and scratches which may occur can be removed. The end user can finish the outer surface of stainable/protective coating 112 to whatever color is desired, which is something that the user cannot do with any of the other alternatives and is otherwise only available from real wood. Because the coating 112 is colorable by the end user, either by staining or painting, then the end user may select the finished color. The end user coloring does not, however, completely mask the wood grain pattern.

It should also be understood that the outer surface of backing 106 is frequently textured. This means that the textured back of the next to the bottom product being stacked in stacking station 82 presses against the outer surface of the bottom product with a force of as much as 4,000 lbs. throughout the shipping process. The disclosed coating formulation and application process creates a surface which is hard enough to withstand the shipping process, and yet porous enough to be readily stained and finished on site.

It should be noted that the process results in a product which has the look and feel of an unfinished piece of wood, which may then be used to manufacture a hollow core door or the like which is then sold unfinished to the user. This allows the end user to either paint the doors as he might any other wood door, or in the alternative to varnish the door, or to stain the doors and then apply protective varnish coat over the stain surface. Alternatively, the semi-finished product of the invention may be used to create paneling, veneers, and like wood-appearing surfaces.

While this invention has been described as having a preferred design, it is understood that it is capable of further modifications, uses, and/or adaptations thereof following in general the principles of the invention and including such departures that have been known or customary practice in the art to which the invention pertains.

What I claim is:

1. A semi-finished wood simulating product formed from a substrate, the product having a surface that simulates the appearance and tactile qualities of raw wood and is capable of accepting paint, varnish or stain as applied by an end user, the product produced by the method comprising the steps of:

a) providing a substrate having at least one surface to be finished;

b) applying a liquid basecoat on the substrate;

c) drying the basecoat;

d) depositing, in liquid form, a wood grain pattern on the basecoat;

e) transferring some of the pattern from the originally deposited position on the basecoat to a subsequent position;

f) curing the pattern;

g) applying a polymerizable protective coating onto the substrate and overlying the basecoat and the pattern, the protective coating sealing the substrate; and h) polymerizing the protective coating, said polymerized protective coating being sufficiently porous to thereafter accept and retain wood stain applied by an end user and being sufficiently hard to permit stacking of a plurality of semi-finished wood simulating products without substantial degradation to said coating.

2. A product as produced by the method in claim 1, including the step of:

providing a substrate having a porous surface.

3. A product as produced by the method in claim 2, including the step of:

providing a substrate selected from the group consisting of medium density fiberboard and pressboard.

4. A product as produced by the method in claim 3, including the steps of:

a) cleaning the porous surface of the substrate;

b) coating the porous surface with a sealer; and c) curing the sealer.

5. A product as produced by the method in claim 1, including the step of:

providing a substrate having a non-porous surface.

6. The product as produced by the method in claim 4, wherein:

the sealer after curing has sufficient impermeability to prevent subsequent liquid materials applied thereon from penetrating through the sealer and contacting the substrate.

7. The product as produced by the method in claim 1, wherein:

the protective coating after polymerization has sufficient transparency to permit the wood grain pattern to be visible therethrough.

8. The product as produced by the method in claim 1, including the step of:

providing a protective coating having sufficient porosity to permit the protective coating to absorb and retain a colorant applied thereto.

9. The product as produced by the method in claim 1, including the step of:

depositing the pattern onto the substrate by rotogravure printing, the rotogravure printing utilizing a print cylinder.

10. The product as produced by the method in claim 9, including the step of:

causing the print cylinder to roll randomly across the substrate from an input edge to an output edge so that when multiple substrates are produced the wood grain pattern is deposited randomly relative to the input edge of the substrate.

11. The product as produced by the method in claim 1, including the steps of:

applying the basecoat in two layers.

12. The product as produced by the method in claim 11, including the step of:

applying the protective coating in two layers.

13. The product as produced by the method in claim 1, including the step of:

providing an acrylic composition as a sealer.

14. The product as produced by the method in claim 1, including the step of:

selecting as the basecoat a vinyl acrylic copolymer having a controlled viscosity so as to simulate the tactile qualities of raw wood when the basecoat is dry.

15. The product as produced by the method in claim 1, including the step of:

selecting as the protective coating an acrylic/amino composition.

16. The product as produced by the method in claim 12, including the steps of:

a) providing a dwell period following application of a first layer of two layers of the basecoat;

b) providing a dwell period following application of a second layer of two layers of the basecoat;

c) burnishing the second of the two basecoat layers;

d) selecting a polymerizable protective coating material dissolved in cosolvents as the polymerizable protective coating; and e) heating the substrate to a temperature sufficient to remove the cosolvents from the protective coating.

17. A semi-finished wood simulating product formed from a substrate, the product having a surface that simulates the appearance and tactile qualities of raw wood and is capable of accepting paint, varnish or stain as applied by an end user, comprising:

a) a substrate with a porous surface;

b) a sealing layer coated on said surface;

c) a basecoat on said sealing layer;

d) a wood grain pattern deposited on said basecoat, said wood grain pattern formed by deposition in liquid form;

e) a polymerized protective coating on said basecoat, said polymerized protective coating being sufficiently porous to thereafter accept and retain wood stain applied by an end user and being sufficiently hard to permit stacking of a plurality of semi-finished wood simulating products without substantial degradation to said coating.

18. The product of claim 17, wherein:

said basecoat is a vinyl acrylic copolymer having a controlled viscosity so as to simulate the tactile qualities of raw wood.

19. The product of claim 18, wherein:

said sealing layer-is an acrylic.

20. The product of claim 17, wherein:

said protective coating is sufficiently transparent to permit said wood grain pattern to be visible therethrough.

21. The product of claim 17, wherein:

said protective coating is sufficiently porous to permit said protective coating to absorb and retain a wood stain when applied thereon.

22. The product of claim 17, wherein:

said protective coating is an acrylic amino polymerizable composition.

23. The product of claim 17, wherein:

said wood grain pattern is deposited randomly relative to an edge of said surface of said substrate.

* * * * *